(12) United States Patent
Yamada et al.

(10) Patent No.: US 6,672,654 B2
(45) Date of Patent: Jan. 6, 2004

(54) VEHICLE BODY FRAME HOLLOW MEMBER

(75) Inventors: Takayuki Yamada, Saitama (JP); Yuta Urushiyama, Saitama (JP); Shunji Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/233,474

(22) Filed: Sep. 4, 2002

(65) Prior Publication Data

US 2003/0042763 A1 Mar. 6, 2003

(30) Foreign Application Priority Data

Sep. 4, 2001 (JP) .................... P. 2001-266596
Sep. 5, 2001 (JP) .................... P. 2001-268374

(51) Int. Cl.$^7$ .................................. B60J 7/00
(52) U.S. Cl. ............ 296/205; 296/187.03; 296/146.6; 296/203.02
(58) Field of Search ............ 296/205, 187.03, 296/146.6, 203.02, 193.1; 52/79.1; 229/5.5, 104

(56) References Cited

U.S. PATENT DOCUMENTS

| | | | | |
|---|---|---|---|---|
| 1,969,030 A | * | 8/1934 | Page | 229/5.5 |
| 2,726,803 A | * | 12/1955 | Ketler | 229/5.5 |
| 4,166,568 A | * | 9/1979 | Swan | 229/5.5 |
| 5,426,900 A | * | 6/1995 | Springer | 52/79.1 |
| 5,431,445 A | * | 7/1995 | Wheatley | 296/187.03 |
| 5,727,826 A | * | 3/1998 | Frank et al. | 296/146.6 |
| 5,810,428 A | * | 9/1998 | Maki | 296/205 |
| 5,868,457 A | * | 2/1999 | Kitagawa | 296/205 |
| 5,913,565 A | * | 6/1999 | Watanabe | 296/187.03 |
| 5,914,163 A | * | 6/1999 | Browne | 296/205 |
| 6,068,330 A | * | 5/2000 | Kasuga et al. | 296/205 |
| 6,099,071 A | * | 8/2000 | Kasuga et al. | 296/205 |
| 6,170,906 B1 | * | 1/2001 | Kasuga | 296/203.02 |
| 6,193,148 B1 | * | 2/2001 | Shimada | 229/104 |
| 6,382,709 B1 | * | 5/2002 | Chirifu et al. | 296/193.1 |
| 6,482,486 B1 | * | 11/2002 | Czaplicki et al. | 296/205 |
| 6,499,798 B2 | * | 12/2002 | Takemoto | 296/205 |
| 6,588,830 B1 | * | 7/2003 | Schmidt et al. | 296/205 |
| 2001/0042986 A1 | * | 11/2001 | Patelczyk | 296/205 |

FOREIGN PATENT DOCUMENTS

JP   11-208519   8/1999

* cited by examiner

*Primary Examiner*—Kiran Patel
(74) *Attorney, Agent, or Firm*—Arent Fox Kintner Plotkin & Kahn, PLLC

(57) ABSTRACT

A vehicle body frame hollow member has an external contour whose cross section forms a polygon and has a plurality of plates, each defining a circumferential wall of the hollow member, each of points of intersection being formed by intersecting prolongations from exterior surfaces of the adjacent two plates, ribs connecting respective apical angles of the polygon with a center shaft thereof; and an elongated projection projecting outwardly of a circle tangent to the points of intersection and extending along an edge of each of the apical angles.

3 Claims, 6 Drawing Sheets

VEHICLE BODY FRAME HOLLOW MEMBER

BACKGROUND OF THE INVENTION

1. Field of the Invention

The present invention relates to a vehicle body frame hollow member for absorbing impact energy generated when a vehicle collides through compression deformation.

2. Description of the Related Art

An applicant for the present invention proposed in the specification of Japanese Patent Publication No. JP-A-11-208519 a vehicle body frame construction in which a vehicle body frame is constructed by hollow extruded members the cross-sectional shape of an external contour of which is formed substantially into a polygon and which each have ribs connecting respective apical angles and a center shaft and extending in an axial direction thereof, whereby impact energy generated when a vehicle collides is absorbed through compression buckling deformation generated in the hollow extruded members when they receive impact load.

According to this construction, since a cross section can be set to provide a suitable buckling strength by setting a relationship between the length of a side of the polygon and the thickness thereof, any desirable impact energy absorbing properties can be obtained without enlarging the exterior dimensions of the hollow member excessively.

However, it is preferable that the energy absorbing amount relative to the cross section of a frame member be as large as possible, and in a case where a vehicle is such that a sufficient crushable zone cannot be set, a further increase in energy absorbing efficiency by the frame member is being desired.

SUMMARY OF THE INVENTION

The invention was made in view of this known situation, and a primary object thereof is to provide a vehicle body frame hollow member which can increase further the energy absorbing efficiency.

To solve the above object, according to a first aspect of the invention, there is provided a vehicle body frame hollow member having an external contour whose cross section forms a polygon, comprising: a plurality of plates, each defining a circumferential wall of the hollow member, each of points of intersection being formed by intersecting prolongations from exterior surfaces of the adjacent two plates; ribs connecting respective apical angles of the polygon with a center shaft thereof; and an elongated projection projecting outwardly of a circle tangent to the points of intersection and extending along an edge of each of the apical angles. Accordingly, the sectional area of the apical angles 3 can be increased without having to deteriorate the buckling deformation behaviors at the time of compression.

Further, the inventor eventually came to know that in a vehicle body frame hollow member having an external contour whose cross section substantially forms a regular polygon and comprising ribs which connect apical angles of respective apical angle portions of the regular polygon with a center shaft thereof and in which interior portions of an intersectional portion formed by two plates constituting an outer circumferential wall of the hollow member and the rib are each formed into a round shape, the relationship between a distance h in a rib-extending direction between an imaginary apex of an inner circumferential wall of the hollow member which shifts from an apex on the outer circumferential wall at the intersectional portion toward the center of the regular polygon by the thickness of the plate and a rib-side end point of the round-shaped portion and a distance L between plate-side end points of the round-shaped portions formed at ends of the plate constituting the outer circumferential wall remarkably influences the energy absorbing efficiency.

With a view to attaining the object, according to a second aspect of the invention, there is provided a vehicle body frame hollow member having an external contour whose cross section substantially forms a regular polygon and comprising ribs which connect apical angles of respective apical angle portions of the regular polygon with a center shaft thereof, the vehicle body frame hollow member being characterized in that interior portions of an intersectional portion formed by two plates constituting an outer circumferential wall of the hollow member and the rib are each formed into a radius, and in that a distance h in a rib-extending direction between an imaginary apex of an inner circumferential wall of the hollow member which shifts from an apex on the outer circumferential wall at the intersectional portion toward the center of the regular polygon by the thickness of the plate and a rib-side end point of the radius is equal to or greater than 13% of a distance L between plate-side end points of the radii formed at ends of the plate constituting the outer circumferential wall. According to the construction, of the entire cross section of the hollow member the cross section of the apical angle portions which provide a large plastic deformation amount can be attempted to be enhanced efficiently, whereby the energy absorbing efficiency can be improved remarkably as shown in FIG. 11.

DETAILED DESCRIPTION OF THE PREFERRED EMBODIMENTS

The invention will be described in detail below with reference to the accompanying drawings.

Figure 1:
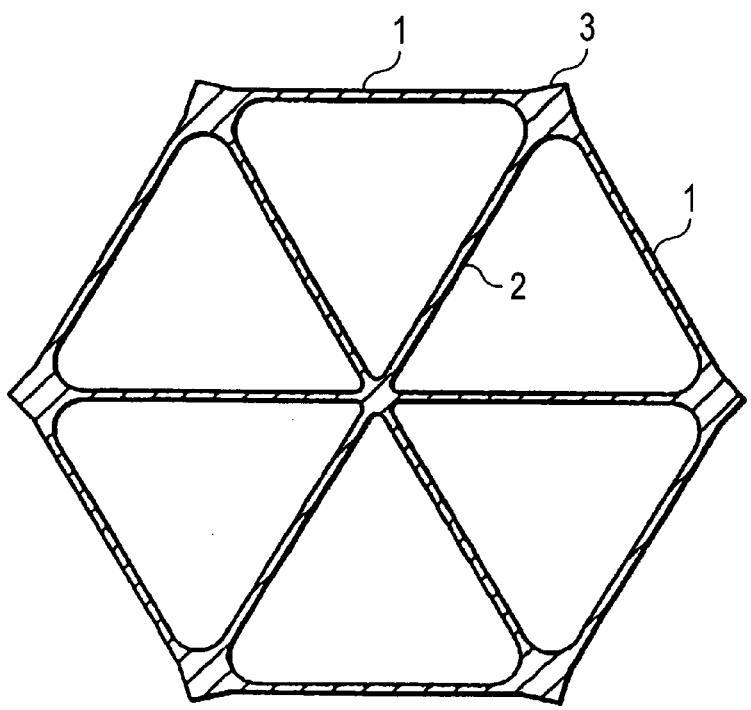
FIG. 1 is a cross-sectional view showing a basic cross section of a first embodiment of a vehicle body frame hollow member to which the invention is applied.

FIG. 1 shows a basic cross-sectional shape of a first embodiment of a vehicle body frame hollow member to which the invention is applied. This vehicle body frame hollow member is constituted by an extruded material of aluminum alloy, and the shape of the external contour of a cross section of the hollow member taken along a direction normal to a central shaft O of the hollow member forms a regular polygon which is constituted by six plates 1 constituting an outer circumferential wall of the hollow member, ribs 2 being provided in a hollow space within the hollow member which connect respective apical angle portions 3 with the center shaft O. Since the relative cross section of the hollow member can be increased without having to increase the external dimensions of the cross section and the thickness of the plates larger than required, it is possible to increase the stability of compression stress over the whole stroke by setting the buckling strength to a suitable level without deteriorating the flexural rigidity of the frame.

Figure 2:
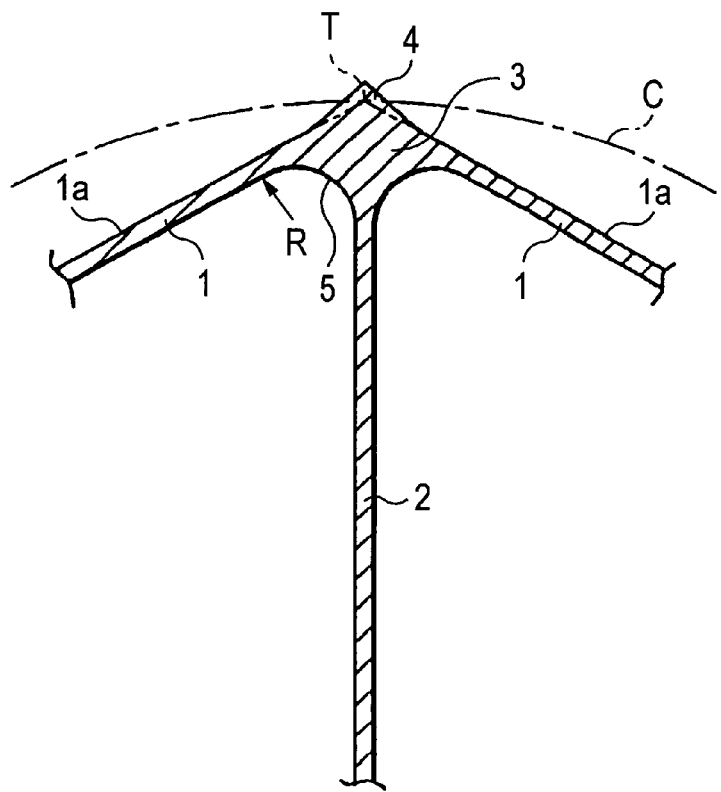
FIG. 2 is an enlarged view of a main part of FIG. 1.

As shown in an enlarged fashion in FIG. 2, edges of three plates having the two plates 1 each forming an outer circumferential wall and a rib 2 are intersected with each other at each apical angle portion 3 of the hollow member. An elongated projection 4 which projects outwardly of a circle C tangent to a point T of intersection between prolongations from exterior surfaces 1a of the two plates 1 is provided so as to extend along the full length of the apical angle portion 3. In addition, interior portions 5 of an intersectional portion formed by the two plates 1 and the rib 2 are each formed into a round shape having a suitable radius.

Figure 3:
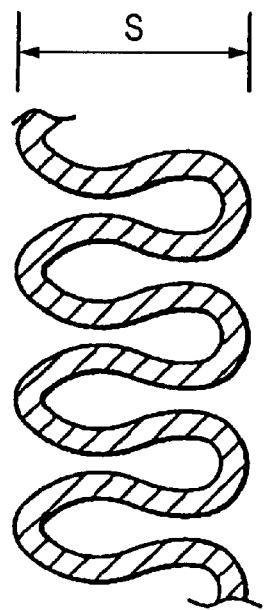
FIG. 3 is a vertical cross-sectional view of the vehicle body frame hollow member showing a buckling deformed condition which explains a buckling wavelength S.

Thus, the elongated projections 4 which project radially outwardly of an external surface of the circumferential wall are provided in the apical angle portions 3 of the polygonal member where the ribs 2 which pass through the center shaft O of the member are provided on the inside thereof. Therefore, since the cross section of the apical angle portions 3 can be increased without having to deteriorate the buckling deformation behaviors at the time of compression, the collapsing load can be increased efficiently. In addition, a buckling wavelength S determined by the height of the apical angle portion 3 can be easily adjusted. Here, the buckling wavelength S means a width of a vertical buckling shown in FIG. 3, or a horizontal length in the FIG. 3.

Figure 4:
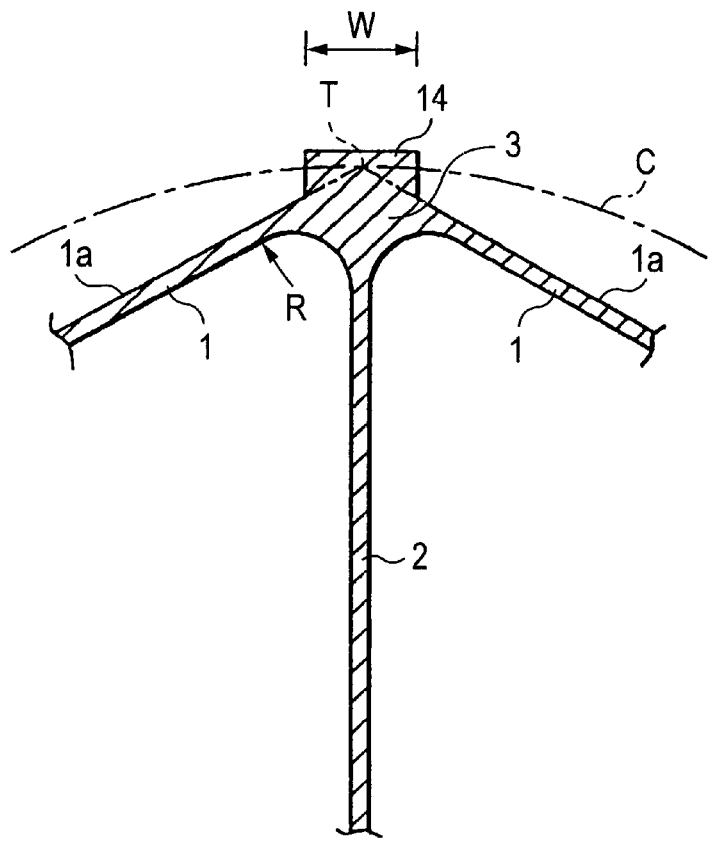
FIG. 4 is an enlarged cross-sectional view, which is similar to FIG. 2, of a second embodiment of a vehicle body frame hollow member to which the invention is applied.

FIG. 4 is an enlarged cross sectional view, which is similar to FIG. 2, showing a second embodiment of a vehicle body frame hollow member to which the invention is applied.

The vehicle body frame hollow member according to the second embodiment, has apical angle portions 3 where edges of three plates including the two plates 1 each forming an outer circumferential wall and a rib 2 are intersected with each other. An elongated projection 14 which projects outwardly of a circle C tangent to points T of intersection of prolongations extending from external surfaces of the two plates 1 and which has a width w extending in a tangential direction of the circle C which passes through the points T of intersection is formed along the full length of the respective apical angle portions 3.

According to the configuration, the cross sectional coefficient can be increased relative to the tangential directions of the circumcircle C, and the collapsing load can be increased efficiently without increasing the weight of the hollow member and without having to deteriorate the buckling deformation behaviors at the time of compression. The remaining constructions of the hollow member according to the second embodiment remain the same as those described with reference to the embodiment 1.

Figure 5:
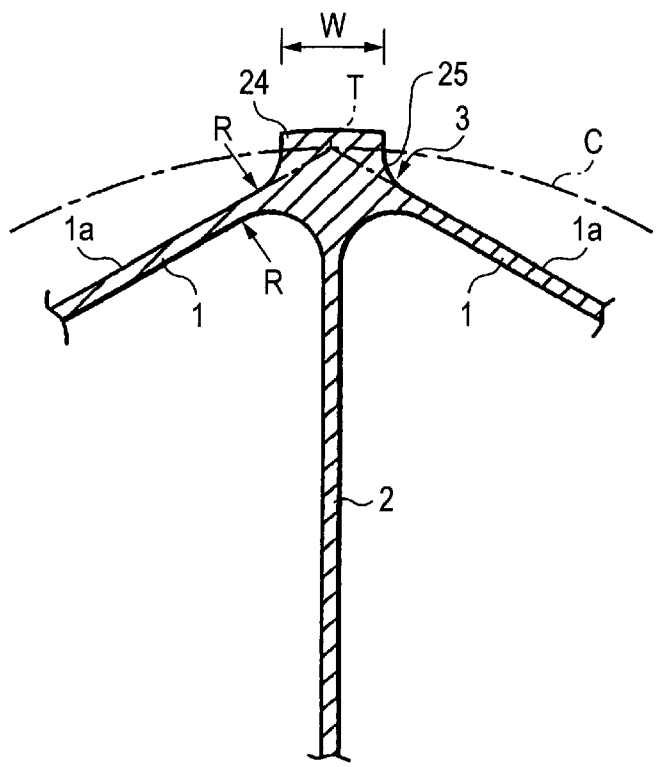
FIG. 5 is an enlarged cross-sectional view, which is similar to FIG. 4, of a third embodiment of a vehicle body frame hollow member to which the invention is applied.

FIG. 5 is an enlarged cross-sectional view, which is similar to FIGS. 2 and 4, showing a third embodiment of a vehicle body frame hollow member to which the invention is applied.

The vehicle body frame hollow member according to the third embodiment, as with that of the second embodiment, has apical angle portions 3 where edges of three plates including the two plates 1 each forming an outer circumferential wall and a rib 2 are intersected with each other. An elongated projection 24 which projects outwardly of a circumcircle C tangent to points T of intersection of prolongations extending from external surfaces of the two plates 1 and which has a width w extending in a tangential direction of the circle C which passes through the points T of intersection are formed along the full length of the respective apical angle portions 3. In addition, each of portions 25 where the two plates 1 are translated into the elongated projection 24 are formed in a round shape.

According to the construction, the cross sectional coefficient can be increased relative to the tangential directions of the circumcircle C, and the collapsing load can be increased at the time of compression deformation. In addition, the concentration of stress to a boundary between the plate 1 and the elongated projection 24 can be suppressed by forming the round shapes at the portions 25 where the plates are translated into the elongated projection 24, and further the collapsing load can be increased more efficiently by enlarging the deformable portion, and a drastic buckling deformation can be prevented. The remaining constructions of the hollow member of this embodiment remain the same as those of the second embodiment.

Figure 6:
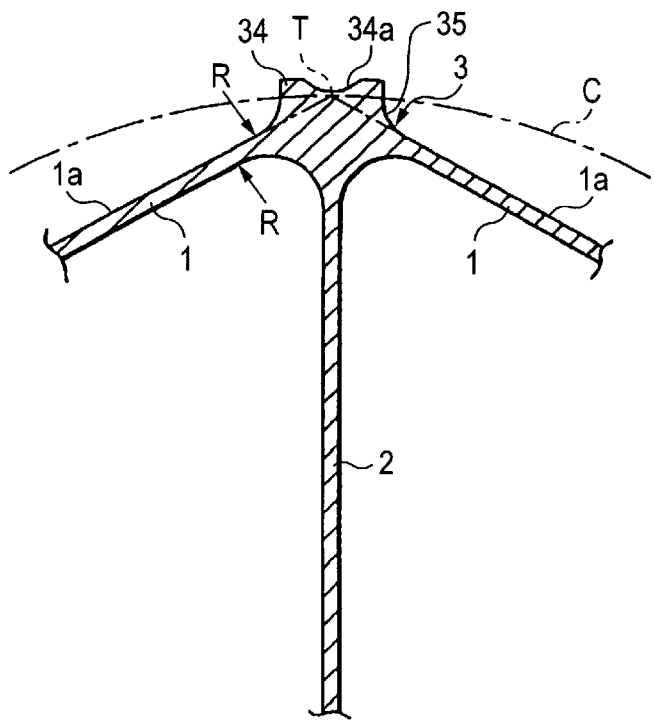
FIG. 6 is an enlarged cross-sectional view, which is similar to FIG. 5, of a fourth embodiment of a vehicle body frame hollow member to which the invention is applied.

FIG. 6 is an enlarged cross-sectional view, which is similar to FIGS. 2 to 5, showing a fourth embodiment of a vehicle body frame hollow member to which the invention is applied.

The vehicle body frame hollow member according to the fourth embodiment, as with that of the third embodiment, has apical angle portions 3 where edges of three plates including the two plates 1 each forming an outer circumferential wall and a rib 2 are intersected with each other. An elongated projection 34 which projects outwardly of a circumcircle C tangent to points T of intersection of prolongations extending from external surfaces of the two plates 1 and which has a width w extending in a tangential direction of the circle C which passes through the points T of intersection is formed along the full length of the apical angle portion 3. In addition, round shapes are formed at portions 35 where the two plates 1 are translated into the elongated projection 34. Furthermore, a recessed portion 34a is formed in a central portion of an outer circumferential end face of the elongated projection 34.

According to the construction, the cross sectional coefficient can be increased relative to the tangential directions of the circumcircle C, and the collapsing load can be increased at the time of compression deformation.

In addition, the concentration of stress to a boundary between the plate 1 and the elongated projection 34 can be suppressed by forming the radius shapes at the portions 35 where the plates are translated into the elongated projection 34 and the collapsing load can be increased more efficiently by enlarging the deformable portion, and a drastic buckling deformation can be prevented. Furthermore, since the deforming direction of the elongated projection 34 is controlled such that the elongated projection 34 is folded down around the recessed portion 34a at the time of buckling deformation by forming the recessed portion 34a in the central portion of the outer circumferential end face of the elongated projection 34, it is possible to make a compact buckling deformation happen. The remaining constructions of the hollow member of this embodiment remain the same as those of the third embodiment.

Figure 7:
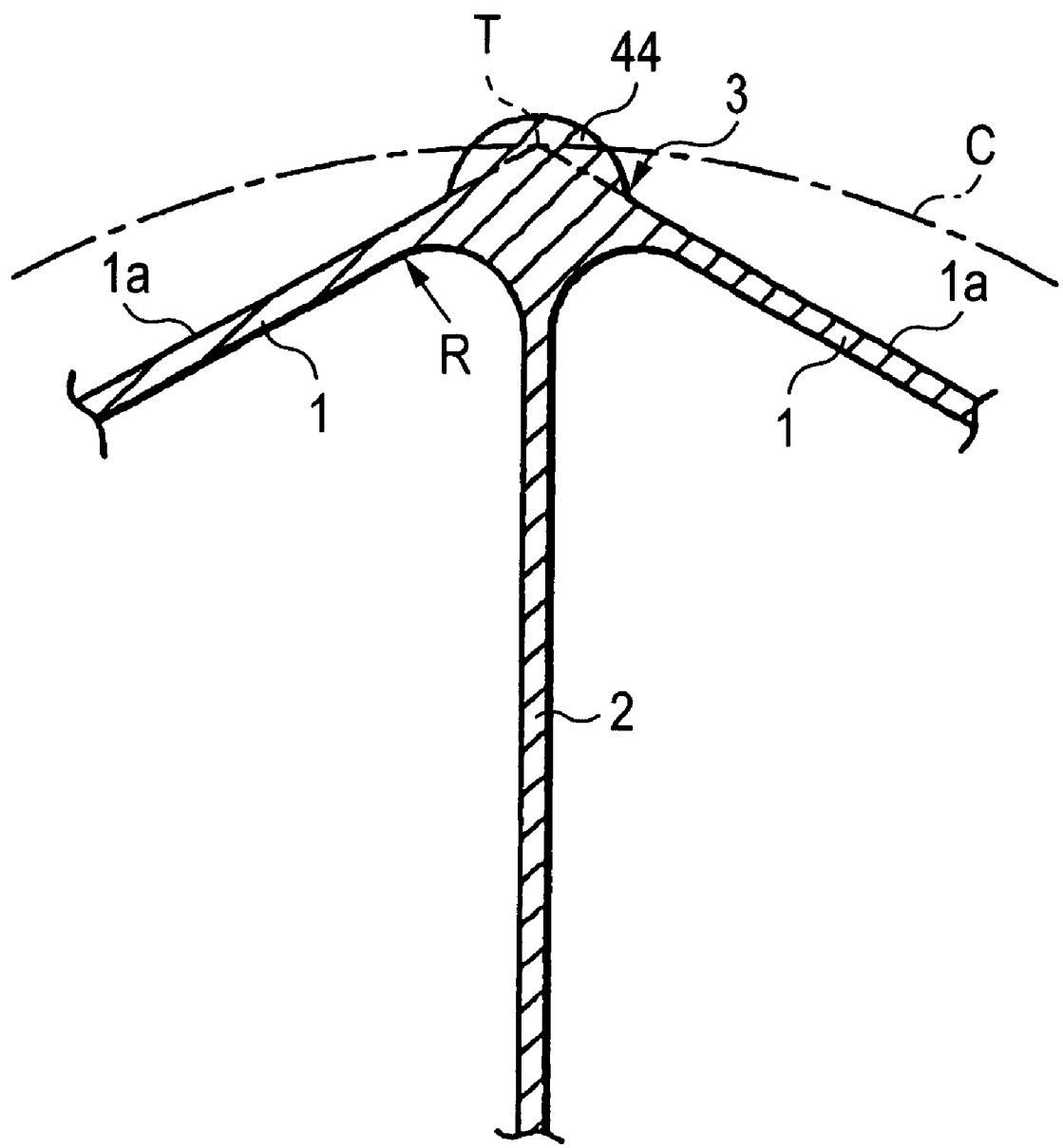
FIG. 7 is an enlarged cross-sectional view, which is similar to FIG. 2, of a fifth embodiment of a vehicle body frame hollow member to which the invention is applied.

FIG. 7 is an enlarged cross-sectional view, which is similar to FIGS. 2 to 6, showing a fifth embodiment is applied.

The vehicle body frame hollow member according to the fifth embodiment, as with that of the first embodiment, has apical angle portions 3 where edges of three plates including the two plates 1 each forming an outer circumferential wall and a rib 2 are intersected with each other. An elongated projection 44 which projects outwardly of a circumcircle C tangent to points T of intersection of prolongations extending from external surfaces of two plates 1 and which has each an arc-like contour are formed along the full length of the respective apical angle portions 3. According to the configuration, not only can the cross-sectional coefficient in the buckling direction be increased but also the buckling wavelength can be adjusted easily. The remaining constructions of the hollow member of this embodiment remain the same as those of the first embodiment.

As has been described in detail heretofore, according to the first to fifth embodiments of the invention, in the vehicle body frame hollow member having an external contour whose cross section forms a polygon and comprising ribs which connect respective apical angles of the polygon with a center shaft thereof, since of the entire cross section of the hollow member the cross section of the apical angle portions which provide a large plastic deformation amount can be attempted to be enhanced efficiently by providing the elongated projection which projects outwardly of the circle tangent to the points of intersection between prolongations from exterior surfaces of two plates which constitute a circumferential wall of the hollow member so as to extend along the edge of each of the apical angles, whereby a plastically deformable area can be increased, thereby making it possible to increase further the resistance to buckling load. Consequently, according to the invention, there can be provided a tremendous advantage that the energy absorbing amount can be increased further without calling for a substantial increase in external dimensions.

Figure 8:
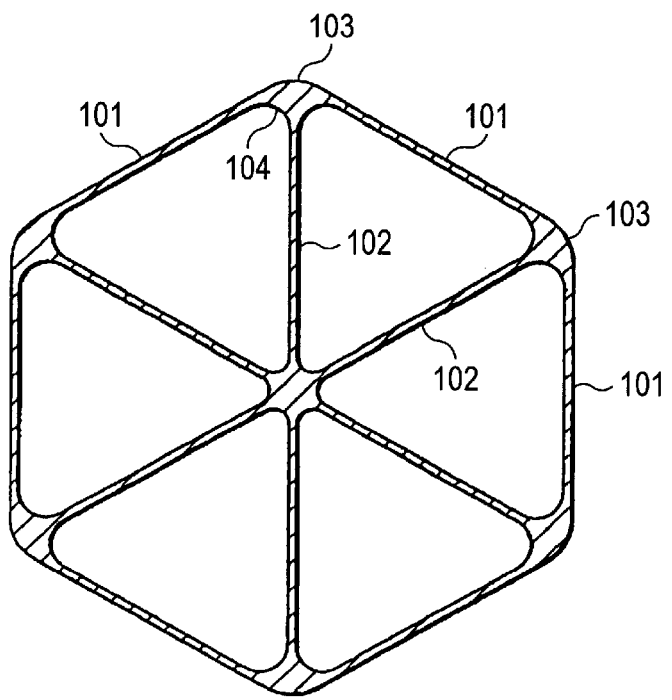
FIG. 8 is a cross-sectional view showing a basic cross section according to a sixth embodiment of a vehicle body frame hollow member to which the invention is applied.
Figure 9:
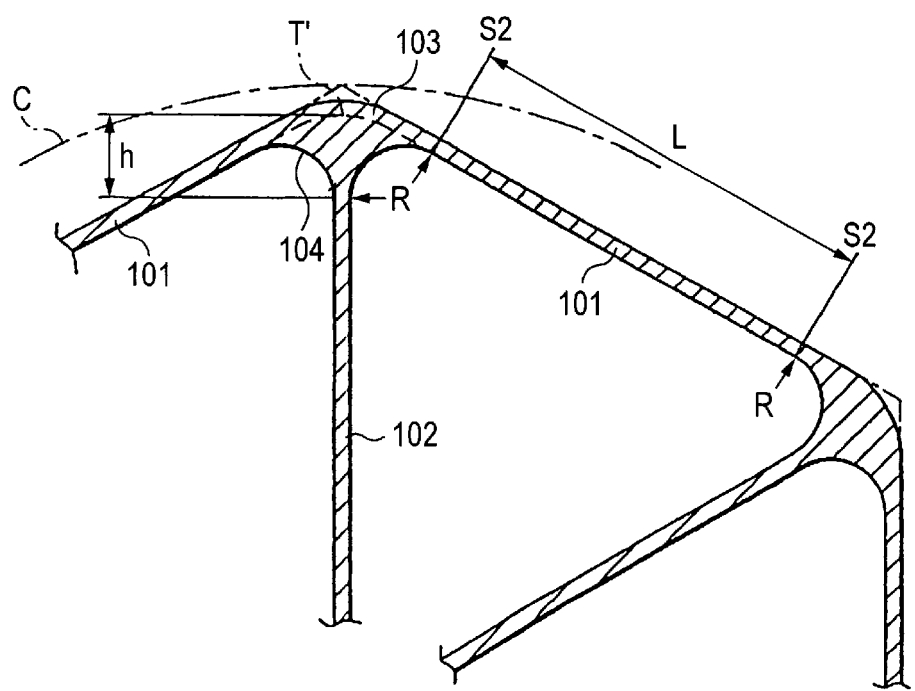
FIG. 9 is an enlarged view of a main part of FIG. 8.

FIGS. 8 and 9 shows a sixth embodiment of a vehicle body frame hollow member to which the invention is applied.

As shown in an enlarged fashion in FIG. 8, in respective apical angle portions 103 where edges of three plates comprising two plates 101 which constitute the outer circumferential wall and a rib 102 intersect with each other, interior portions of the intersectional portion where the two plates 101 and the rib 102 intersect with each other are each formed into a round shape.

Here, a distance h (hereinafter, referred to as the height of the apical angle portion 103) in a rib-extending direction between an imaginary apex T of an inner circumferential wall of the hollow member which shifts from an apex on the outer circumferential wall at each apical angle portion 103 formed by the two adjacent plates 1 constituting the outer circumferential wall toward the center of the regular polygon by the thickness of the plate 101 and a rib-side end point of the round shape of the interior portion 104 is equal to or greater than 13% of a distance L (hereinafter, referred to as the length of the plate 101) between plate-side end points of the round shapes formed at ends of the plate 101.

Figure 10:
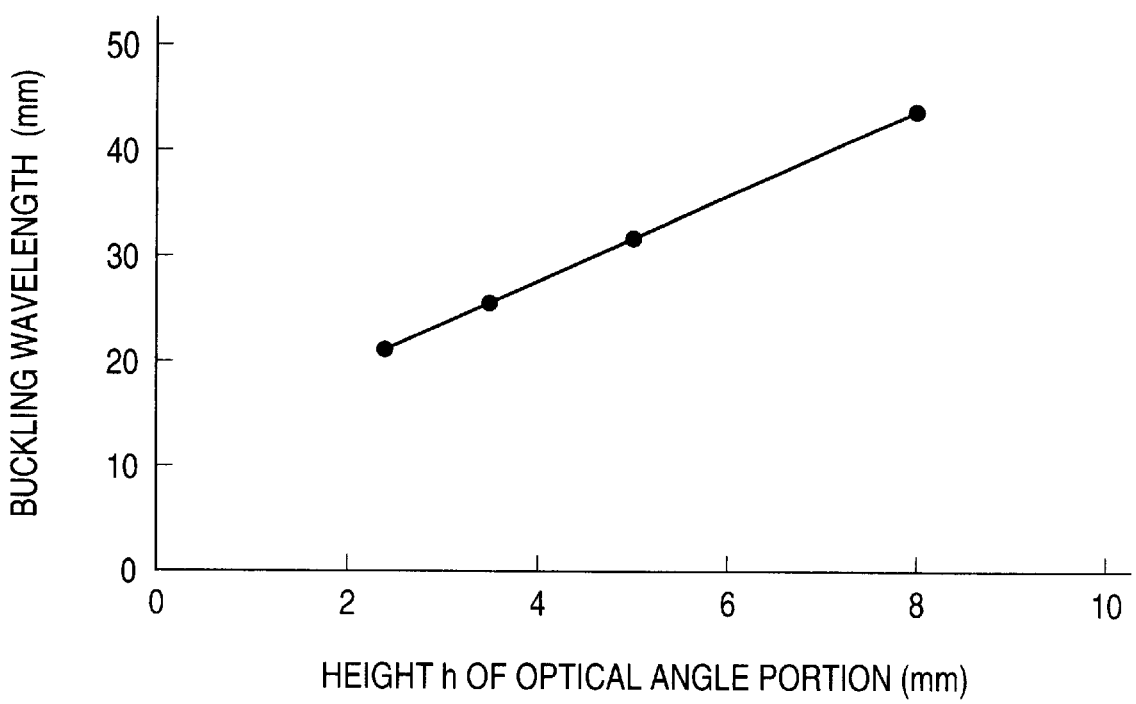
FIG. 10 is a graph showing a relationship between an imaginary apex of an inner circumferential wall of the hollow member which shifts from an apex on the outer circumferential wall at the intersectional portion between plates constituting the outer circumferential wall and a rib toward the center of the hollow member by the thickness of the plate and a rib-side end point of a radius and a buckling wavelength S according to the sixth embodiment.

As shown in FIG. 10, a buckling wavelength S is determined by the height h of the apical angle portion 103, and the height h of the apical angle portion 103 and the buckling wavelength S are in a substantially proportional relationship. Here, the buckling wavelength S means a width of a vertical buckling shown in FIG. 3, or a horizontal length in the FIG. 3.

Figure 11:
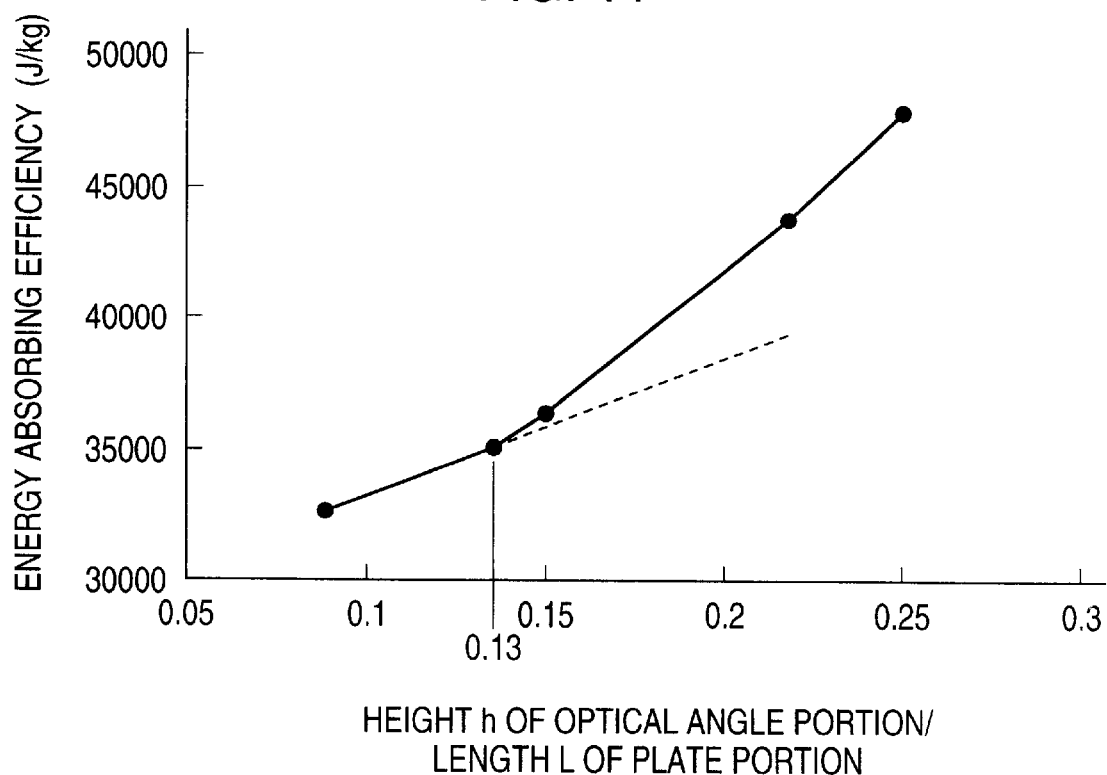
FIG. 11 is a graph showing a relationship between a ratio of a distance L between plate-side end points of radii formed at ends of a plate constituting an outer circumferential wall having a height h at an apical angle portion and an energy absorbing efficiency according to the sixth embodiment.

As shown in FIG. 11, however, the energy absorbing efficiency drastically increases when the relationship between the length L of the plate 101 and the height h of the apical angle portion 103 is such that the height h of the apical angle portion 103 is equal to or larger than 13% of the length L of the plate 101 (h/L≧0.13).

Here, raised as dimensions that can be changed to satisfy the relationship expressed by h/L≧0.13 are the length L of the plate 101, the thickness of the plate 101, the shape of the radius of the interior portion 104 at each apical angle portion 103 and the shape of each apical angle portion 103 on an outer-wall side thereof (the shape does not always have to be formed into a radius), and the relationship expressed by h/L≧0.13 may be satisfied by suitably setting those factors.

As has been described heretofore, according to the sixth embodiment of the invention, in the vehicle body frame hollow member having an external contour whose cross section substantially forms a regular polygon and comprising ribs which connect apical angles of respective apical angle portions of the regular polygon with a center shaft thereof, since of the entire cross section of the hollow member the cross section of the apical angle portion which provide a large plastic deformation amount can be attempted to be increased by making the distance h in a rib-extending direction between the imaginary apex of the inner circumferential wall of the hollow member which shifts from the apex on the outer circumferential wall at the intersectional portion toward the center of the regular polygon by the thickness of the plate and the rib-side end point of the radius equal to or greater than 13% of the distance L between plate-side end points of the radii formed at ends of the plate constituting the outer circumferential wall, whereby a plastically deformable area can be increased, the resistance to buckling load can be increased further. Consequently, according to the invention, there can be provided a tremendous advantage that the energy absorbing amount can be increased further without calling for a substantial increase in external dimensions.

What is claimed is:

1. A vehicle body frame hollow member having an external contour whose cross section forms a polygon, comprising:

a plurality of plates, each defining a circumferential wall of the hollow member, wherein each of points of intersection is formed by intersecting prolongations from exterior surfaces of the adjacent two plates;

ribs connecting respective apical angles of the polygon with a center shaft thereof; and an elongated projection projecting outwardly of a circle tangent to the points of intersection and extending along an edge of each of the apical angles.

2. The vehicle body frame hollow member according to claim 1, wherein a portion of the circumferential wall between the plate and the elongated projection is formed in a round shape.

3. The vehicle body frame hollow member according to claim 1, wherein the elongated projection has a recessed portion in a center portion thereof.

* * * * *